US009249317B2

(12) United States Patent
Greenwood et al.

(10) Patent No.: US 9,249,317 B2
(45) Date of Patent: Feb. 2, 2016

(54) ALKYD-BASED COATING COMPOSITION

(75) Inventors: Peter Harry Johan Greenwood, Göteborg (SE); Hans Lagnemo, Göteborg (SE)

(73) Assignee: AKZO NOBEL CHEMICAL INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/007,276

(22) PCT Filed: Mar. 23, 2012

(86) PCT No.: PCT/EP2012/055230
§ 371 (c)(1),
(2), (4) Date: Oct. 25, 2013

(87) PCT Pub. No.: WO2012/130763
PCT Pub. Date: Oct. 4, 2012

(65) Prior Publication Data
US 2014/0039093 A1    Feb. 6, 2014

Related U.S. Application Data

(60) Provisional application No. 61/467,578, filed on Mar. 25, 2011.

(30) Foreign Application Priority Data

Mar. 25, 2011   (EP) .................................... 11159859

(51) Int. Cl.
*C09D 167/08* (2006.01)
*C08K 3/36* (2006.01)
*C09D 7/12* (2006.01)
*C09D 167/06* (2006.01)
*C09D 5/02* (2006.01)
*C09D 5/16* (2006.01)
*C09D 7/00* (2006.01)
*C08L 67/08* (2006.01)
*C09C 3/12* (2006.01)
*C08K 9/06* (2006.01)

(52) U.S. Cl.
CPC .............. *C09D 7/1225* (2013.01); *C09D 5/028* (2013.01); *C09D 5/1662* (2013.01); *C09D 7/00* (2013.01); *C09D 7/1266* (2013.01); *C09D 167/06* (2013.01); *C09D 167/08* (2013.01); *C08K 3/36* (2013.01); *C08K 9/06* (2013.01); *C08K 2201/019* (2013.01); *C08L 67/08* (2013.01); *C09C 3/12* (2013.01)

(58) Field of Classification Search
None
See application file for complete search history.

(56) References Cited

U.S. PATENT DOCUMENTS

| 2,630,410 | A | 3/1953 | Clapsadle et al. |
| 3,027,341 | A | 3/1962 | Boucher et al. |
| 4,116,902 | A | 9/1978 | Harris et al. |
| 4,927,749 | A | 5/1990 | Dorn |
| 5,368,833 | A | 11/1994 | Johansson et al. |
| 5,928,790 | A | 7/1999 | Bokisa |
| 2004/0040468 | A1* | 3/2004 | Nomura et al. ............... 106/310 |

FOREIGN PATENT DOCUMENTS

| EP | 1554221 B1 | 7/2009 |
| EP | 2087045 B1 | 12/2013 |
| WO | WO 2004/035474 A1 | 4/2004 |
| WO | WO 2007/067203 A1 | 6/2007 |
| WO | WO 2008/080807 A1 | 7/2008 |
| WO | WO 2010/057124 A2 | 5/2010 |
| WO | WO 2010/103020 A1 * | 9/2010 |
| WO | WO 2011/054774 A1 | 5/2011 |
| WO | WO 2010/053729 A1 | 5/2014 |

OTHER PUBLICATIONS

EPO Search Report dated Jun. 29, 2011 for Application No. 11159859.5-2102.
International Search Report with a date of mailing of Apr. 23, 2012 for Application No. PCT/EP2012/055230.
Iler & Dalton, Degree of Hydration of Paticles of Colloidal Silica in Aqueous Solution, Jul. 1956, pp. 955-957.
Iler, The Chemistry of Silica, 1979 by John Wiley & Sons, Inc., US, pp. 406-409.
Hoffman, Improving Soiling Resistance With the Aid of Nanoparticles, Sep. 2009/Jan. 2011, Stockholm SE, pp. 1-67.
Alkyd, http://en.wikipedia.org/wiki/Alkyd, accessed on Mar. 23, 2015.
Deltech Corporation, http://www.deltechcorp.com/deltech02/resins10/modified.htm, accessed on Mar. 23, 2015, all contents copyright 2010 Deltech Corporation.
Cray Valley, Resins for Decorative Coatings, Product Guide, Aug. 2009, p. 6, http://www.crayvalley.com accessed on Mar. 22, 2011.

* cited by examiner

*Primary Examiner* — Marc Zimmer
(74) *Attorney, Agent, or Firm* — Kenyon & Kenyon LLP

(57) ABSTRACT

The present invention relates to a coating composition comprising: a) silanized colloidal silica particles; b) alkyd-containing binder; c) a carrier fluid, wherein the coating composition is essentially free from a cobalt-based drier. The present invention also relates to a method of producing a coating composition and the use of such coating composition for coating of a substrate.

11 Claims, No Drawings

ALKYD-BASED COATING COMPOSITION

This application is a national stage filing under 35 U.S.C. §371 of PCT/EP2012/055230, filed Mar. 23, 2012, which claims priority to U.S. Provisional Patent Application No. 61/467,578, filed on Mar. 25, 2011, and European Patent Application No. 11159859.5, filed Mar. 25, 2011, the contents of which are incorporated herein by reference in their entirety.

The present invention relates to a coating composition, e.g. a dispersion or emulsion and a method of preparing such composition. The invention also relates to the use of the coating composition, for example for formation of paint films on substrates.

BACKGROUND OF THE INVENTION

It is commonly known in the art to use siccatives in coating dispersions such as paint dispersions. Typically, such siccatives contain metal soaps (metallic driers). Metal soaps may contain for example cobalt, lead, vanadium, or manganese but also soaps with other metals are available in the art. A previously preferred metal soap was cobalt soap due to its excellent performance with respect to drying time. Such metallic driers also contribute to reduced tackiness. Also, such driers are dissolved in suitable solvents, normally in aliphatic hydrocarbons which introduce up to 1 wt % volatile organic compounds to a coating dispersion or emulsion. Such driers, however, are hazardous to human health and may even be cancerogeneous.

The amount of drier used in waterborne systems is often used in higher concentrations than in solventborne systems to compensate for losses of primary driers (or active driers) such as cobalt, vanadium and manganese based driers.

While the solids portion of a coating dispersion adheres to the coated substrate, the solvent component if solventborne evaporates and causes environmental concern. The solvent materials are mostly volatile organic compounds (VOCS) that contribute to the creation of ozone (smog) in the lower atmosphere and are toxic to human health. Some solvents may also be classified as hazardous air pollutants (HAPs).

Alkyds are known to be used in coatings, in particular in paints. Such paints may be applied by means of solventborne and waterborne formulations. However, in particular waterborne paints may suffer from disadvantages such as low drying speed, drier incompatibility, through-drying, surface defects, poor hardness etc.

The present invention intends to provide an environmentally adapted coating composition which considerably reduces the metallic drier (active drier) content therein, or even completely omits the presence thereof in order to minimize evaporation of volatile organic compounds as a coating composition is drying on a substrate and hazardous metals, in particular cobalt, remaining in the formed coating. A further objective of the invention is to provide reduced yellowing of coatings.

The invention also intends to provide a composition which improves the vapour permeability of the film formed from e.g. a coating dispersion. A further objective is to reduce the drying time subsequent to application of such coating composition to a substrate. A further objective is to provide a reduced tack-free time. Another objective is to provide an improved dirt-pick up resistance to the film formed from the coating composition. A further objective of the invention is to improve the block resistance of the composition. A further objective is to provide an acceptable hardness to the coating. A further important objective of the present invention is to provide a stable coating composition which is not liable to gelling or precipitation. It is thus a requirement that the coating composition can be stored for a certain period of time, for example at least one year or at least two years without detrimental effects caused by separation or gelling. According to one embodiment, yet an objective is to provide an environmentally adapted system which is waterborne. According to yet one embodiment, the invention also intends to provide a composition having an improved hiding power.

The present invention intends to solve the problems referred to above.

THE INVENTION

The present invention relates to a coating composition comprising
  a) silanized colloidal silica particles
  b) an alkyd-containing binder
  c) a carrier fluid
  wherein the coating composition is essentially free from a cobalt-based drier.

According to one embodiment, the carrier fluid is water and/or an organic solvent, preferably water. The coating composition may thus be waterborne, solvent borne, a solution or a mixture thereof. According to one embodiment, the carrier fluid is present in the composition, which preferably is an aqueous dispersion, for example before drying is initiated thereof, in an amount from about 20 to about 80, for example from about 30 to about 70, or from about 40 to about 60 wt %.

According to one embodiment, the coating composition is a coating dispersion. In the present application, when addressing a "coating composition" herein, both coating dispersions, coating emulsions and coating solutions are comprised. For reasons of simplicity, embodiments herein are often described as dispersions but may be applicable also for any other composition, such as emulsions or solutions.

Preferably, the coating composition is stable. By the term "stable" is meant the composition is present in an aqueous dispersion comprising components a)-c) wherein no gelling or precipitation occurs at storage at a temperature from 15 to 30° C. during two months, preferably during four months, or most preferably during six months.

According to one embodiment, the coating composition is essentially free from active driers. By "active driers" is meant driers which promote oxygen uptake, peroxide formation, and peroxide decomposition at ambient temperatures, i.e. at a temperature from 0 to 40°. Preferably, the coating composition is free from active driers based on cobalt, manganese, iron, cerium, vanadium, and/or lead. According to one embodiment, the metal content of the active drier is present in the composition in an amount less than 200, for example less than 20 or less than 2 ppm or 0 ppm based on the weight of alkyd-containing binder or total weight of binder. According to one embodiment, the active drier, based on cobalt, manganese, iron, cerium, vanadium, and/or lead, is present in the coating composition in an amount less than 100, for example less than 10 or less than 1 ppm or 0 ppm based on the weight of alkyd-containing binder or total weight of binder.

According to one embodiment, the coating composition is paint, enamel, lacquer or varnish dispersion. Preferably, the composition is an aqueous dispersion or emulsion. According to one embodiment, no active drier is present in the coating composition.

According to one embodiment, the coating composition comprises an auxiliary drier. An auxiliary drier is not catalytically active at ambient temperatures, i.e. at a temperature ranging from 0 to 40° C. but may be able to enhance the activity of active driers. According to one embodiment, auxiliary driers are based on metals selected from barium, zirconium, calcium, bismuth, zinc, potassium, strontium, and/or lithium, preferably zirconium.

According to one embodiment, the metal content of the auxiliary drier is present in the composition in an amount less than 1%, for example less than 0.5% or less than 3000 ppm or 0.25 or 0 ppm based on the weight of alkyd-containing binder or total weight of binder. According to one embodiment, the auxiliary drier based on barium, zirconium, calcium, bismuth, zinc, potassium, strontium, and/or lithium is present in the coating composition in an amount less than 10%, for example less than 5% or less than 3% or 0.25 or 0 ppm based on the weight of alkyd-containing binder or total weight of binder. According to one embodiment, the composition comprises besides alkyd-containing binder optionally any further binder. According to one embodiment, the weight ratio of alkyd-containing binder to other binder ranges from about 2:1 to about 100:1, for example from about 5:1 to about 100:1, such as 10:1 to about 100:1, or 50:1 to about 100:1.

According to one embodiment, alkyd-containing binder is present in the composition in an amount from about 10 to about 90 wt %, for example from about 70 to about 90 wt %, or for example from about 10 to about 30 wt % based on the dry or carrier fluid free weight of the composition.

According to one embodiment, the silanized colloidal silica particles are present in the coating composition in an amount ranging from about 1 to about 50, preferably from about 2 to about 25, more preferably from about 5 to about 20, or most preferably from about 8 to about 15 wt % based on the dry or carrier fluid free weight of the composition.

According to one embodiment, the weight ratio of silanized colloidal silica particles to alkyd-containing binder or total amount of binder is in the range from about 0.05 to about 2, for example from about 0.1 to about 1, preferably from about 0.2 to about 0.6, more preferably from about 0.3 to about 0.5. This weight ratio can thus be based on both alkyd-containing binder and total amount of binder present in the composition.

According to one embodiment, other binders than alkyd-containing or alkyd-based binders may be comprised in the composition, for example acrylate-based binders, or epoxy-based, or polyurethane-based binders, or combinations thereof. According to one embodiment, the alkyd-containing binder is selected from tall oil-based, linseed oil-based, or castor oil-based alkyds.

According to one embodiment, the carrier, fluid is a component in the coating composition before use of the coating composition, for example before application thereof on a substrate, but is withdrawn, for example evaporated afterwards to allow the solid materials to immobilize and form a coating, e.g. a thin protective film.

According to one embodiment, alkyds include waterborne and/or solventborne alkyd coatings, such as waterborne and/or solventborne alkyd paints. According to one embodiment, such coating compositions may be oxidatively drying. According to one embodiment, alkyd coatings can be alkyd emulsions or colloidally dispersed alkyd resins. According to one embodiment, waterborne alkyds are used. According to one embodiment, the alkyds are modified, non-modified, or a mixture thereof. Alkyds can be prepared by condensation polymerization of for example polyols, polybasic acids and/or fatty acids or triglyceride oils.

According to one embodiment, an alkyd is a polyester modified by the addition of fatty acids and other components. They are derived from polyols and a dicarboxylic acid or carboxylic acid anhydride. There are two types of alkyd resins, drying (including semi-drying) and non-drying alkyd resins. Both types are typically produced from dicarboxylic acids or anhydrides, such as phthalic anhydride or maleic anhydride, and polyols, such as trimethylolpropane, glycerine, or pentaerythritol.

Drying resins, triglycerides derived from polyunsaturated fatty acids are often derived from plant and vegetable oils, e.g. linseed oil. These drying alkyds are cured in air. The drying speed and the nature of the coatings depends on the amount and type of drying oil employed (more polyunsaturated oil means faster reaction in air) and use of metal salts, the so-called oil drying agents. These metal complexes catalyze crosslinking of the unsaturated sites.

According to one embodiment, alkyd coatings are produced in two processes; the fatty acid process and the alcoholysis or mono-glyceride process. Higher quality alkyds are produced in the fatty acid process where the composition of the resulting resin can be more precisely controlled. In this process an acid anhydride, a polyol and an unsaturated fatty acid are combined and cooked together until the product has achieved a predetermined level of viscosity. For example penta alkyds are made this way. More economical alkyd resins are produced from the alcoholysis or glyceride process where end product quality control is not as paramount. In this process raw vegetable oil, high in unsaturated component, is combined with additional polyol and heated to cause transesterification of the triglycerides into a mixture of mono- and diglyceride oils. To this resulting mixture, acid anhydride is added to build up the molecular weight of the resin into roughly the same product as in the fatty acid process. However, the alcoholysis process produces a more randomly oriented structure. To remove the water produced as a by-product and to increase the reaction rate, surplus phthalic anhydride was added. Water is thus removed with the unreacted acid by heating the bulk to a temperature needed to do this. Also, xylene can be added to produce an azeotrope with the water resulting in greater control at a lower temperature resulting in resins at a lower viscosity which are useful in making high solids paints (known as the AZO process). In both cases the resulting product is a polyester resin to which pendant drying oil groups are attached.

Alkyd coatings may be classified in three classes; long, medium, and short. These terms represent the relative fraction of the drying oil component in the resin. Long oil alkyds have a high percentage of drying oil content and are generally sold as medium duty coatings for the consumer market. Medium oil alkyds have less drying oil and have a higher percentage of large molecular weight polyester backbone. They dry slower and are employed as high gloss coatings and wood finishes. At the bottom end are short oil alkyds where the percentage of drying oil is very low in relation to the base polyester polymer or backbone chain. These coatings will not air dry or harden unless heated. Short oil alkyds are employed as baking enamels for finished metal products, in conjunction with amino/formaldehyde resins. Alkyds are also modified with phenolic resin, styrene, vinyl toluene, acrylic monomers (to make them dry more quickly) and polyurethanes. By adding certain modifying resins, it is possible to produce thixotropic alkyds for decorative use. The latest alkyds are short oil A/D resins where the oil length is shortened by chain stopping with benzoic acid and now para tertiary butyl benzoic acid (Alkydal M 48). Alkyds for decorative use have extra oil cooked in to lengthen them and to make them more durable. Short oil resins used in stoving enamels are made from non-drying saturated oils or fatty acids. These usually have much higher hydroxyl and acid values, to be able to react with the hydroxyl groups of the amino resins. These mixtures are usually stabilized with amines to prevent gelling on storage.

Typical sources of drying oils for alkyd coatings are, linseed oil, tung oil, sunflower oil, safflower oil, walnut oil, soybean oil, fish oil, corn oil, D.C.O. (made by dehydrating Castor oil, which creates a semi drying, conjugated, oil/fatty acid) and tall oil (resinous oil by-product from pulp and paper manufacturing). Non-drying/plasticizer resins are made from castor, palm, coconut oils and Cardura (a synthetic fatty, Versatic acid ex Shell). Suitable alkyds are further disclosed in e.g. Alkyd Resins, p. 1-18, Jones, N. Frank, Coatings Research Institute, Eastern Michigan University, Ypsilanti, Mich. 48197, USA, 2005, Wiley-VCH Verlag GmbH & Co.KgaA, Weinheim 10.1002/14356007.a01_409.

According to one embodiment, the silanized colloidal silica particles may be further modified and can contain other elements such as aluminium and/or boron, which can be present in the particles and/or the continuous phase. Boron-modified silica sols are described in e.g. U.S. Pat. No. 2,630,410. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The silanized colloidal silica particles may have a specific surface area from about 20 to about 1500, specifically from about 50 to about 900, and more specifically from about about 70 to about 600, or from about 120 to about 600, or from about 200 to about 400, or from about 220 to about 360 $m^2/g$ as measured by the BET method.

The silanized colloidal silica particles, for example as disclosed in EP 2087045 may have an average particle diameter ranging from about 2 to about 150 nm, for example from about 3 to about 60 such as from about 5 to about 40 or from about 5 to about 25 nm, or from about 6 to about 12, or from about 7 to about 10 nm.

The colloidal silica particles may have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution may be lower than about 60% by numbers, specifically lower than about 30% by numbers, and more specifically lower than about 15% by numbers.

The colloidal silica particles are dispersed in an aqueous medium, specifically in the presence of stabilising cations such as $K^+$, $Na^+$, $Li^+$, $NH_4^+$, organic cations, primary, secondary, tertiary, and quaternary amines, or mixtures thereof so as to form an aqueous silica sol. The colloidal silica particles as such used in the present invention do not gel and remain in colloidally dispersed form for at least 2 months, preferably at least 4 months and most preferably at least 6 months. However, also dispersions comprising organic mediums, e.g. acetone may be used, specifically in an amount of from about 1 to about 20, specifically from about 1 to about 10, and more specifically from about 1 to about 5 volume percent of the total medium volume. However, in one specific embodiment aqueous silica sols without any further mediums are used. The colloidal silica particles may be negatively charged. The silica content in the silica sol may be from about 10 to about 80, specifically from about 20 to about 70, and more specifically from about 30 to about 60 wt %. The higher the silica content, the more concentrated the resulting silanised colloidal silica dispersion. The pH of the silica sol may be from about 1 to about 13, specifically from about 6 to about 12, and more specifically from about 7.5 to about 11. However, for aluminium-modified silica sols, the pH may be from about 1 to about 12, specifically from about 3.5 to about 11. According to one embodiment, the colloidal silica particles are dispersed in an organic medium, for example as described in EP2010/066551.

The silica sol may have an S-value from about 20 to about 100, specifically from about 30 to about 90, and more specifically from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the colloidal silica particles. A high S-value indicates low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

The colloidal silica particles, also referred to as silica sols herein, can be produced from different raw materials, for example from precipitated silica, micro silica (silica fume), pyrogenic silica (fumed silica) or silica gels with sufficient purity, and mixtures thereof after conventional processing thereof; they may be silanised by way of the method described in WO2004/035474. The silica sol may also, typically, be obtained from waterglass as disclosed in e.g. U.S. Pat. No. 5,368,833 which may be obtained from sand, soda or other raw materials. TEOS (Tetraethyl orthosilicate) may also be used as source for production of silica sol.

The colloidal silica particles can be modified with any suitable silane compound. For example, tris-(trimethoxy)silane, octyl triethoxysilane, methyl triethoxysilane, methyl trimethoxysilane; bis-(3-[triethoxysilyl]propyl)polysulfide, beta-(3,4-epoxycyclohexyl)-ethyl trimethoxysilane, gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane; propyltriethoxy silane, phenyltrimethoxy silane, cyclohexyltrimethoxy silane, cyclohexyltriethoxy silane, dimethyldimethyoxy silane, 3-chloropropyltriethoxy silane, 3-methacryloxypropyltrimethoxy silane, i-butyltriethoxy silane, trimethylethoxy silane, phenyldimethylethoxy silane; silanes containing an epoxy group (epoxy silane), preferably glycidoxy and/or a glycidoxypropyl group such as gamma-glycidoxypropyl trimethoxysilane, gamma-glycidoxypropyl methyldiethoxysilane, (3-glycidoxypropyl)triethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; hexamethyldisiloxane, trimethylsilyl chloride, vinyltriethoxy silane, hexamethyldisilizane, and mixtures thereof. According to one embodiment, silane compounds with mercapto functionality may be used, for example 3-mercaptopropyltrimethoxysilane, 3-mercaptopropyltriethoxy silane, $HS(CH_2)_3$, $Si(OCH_3)_3$, mercaptosilane possessing at least one hydroxyalkoxysilyl group and/or a cyclic dialkoxysilyl group, gamma-mercaptopropyl trimethoxysilane, gamma-mercaptopropyl triethoxysilane, gamma-mercaptopropyl trimethoxysilane.

According to one embodiment, silane compounds with amido-functionality, for example (meth)acryl amide groups; ureido-functionality, amino-functionality, ester functionality and/or isocyanato functionality such as tris-[3-(trimethoxysilyl)propyl]isocyanurate may be used. Suitable ureido functional silanes include β-ureidoethyl-trimethoxysilane, β-ureidoethyl-triethoxysilane, γ-ureidoethyltrimethoxysilane, and/or γ-ureidopropyl-triethoxysilane. Silane compounds with ureido functionality may have the structure $B_{(4-n)}$—Si-(A-N(H)—C(O)—NH$_2$)$_n$, wherein A is an alkylene group containing from 1 to about 8 carbon atoms, B is a hydroxyl or alkoxy group containing from 1 to about 8 carbon atoms, and n is an integer from 1 to 3 provided that if n is 1 or 2, each B may be the same or different.

Preferably, an epoxy group-containing silane is used, most preferably glycidoxy and/or a glycidoxypropyl group such as gamma-glycidoxypropyl trimethoxysilane, gamma-glycidoxypropyl methyldiethoxysilane, (3-glycidoxypropyl)triethoxy silane According to one embodiment, silane with amino-functionality can be for example aminomethyltriethoxysilane, N-(β-aminoethyl)aminomethylthyltrimethoxysilane, aminomethylmethyl diethoxysilane, N-(β-aminoethyl)methyltriethoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane, and N-(β-aminoethyl)-γ-aminopropylmethyldimethoxysilane. Further examples of the above silane functionalities which may be used include those mentioned in U.S. Pat. No. 5,928,790 and U.S. Pat. No. 4,927,749, hereby incorporated by reference.

According to one embodiment, the silane compound is monomeric. According to one embodiment, the silane compound is oligomeric.

In order to prepare the silanised colloidal silica particles, silane compounds and colloidal silica particles can be mixed continuously, for example in an aqueous phase, for example at a temperature from about 20 to about 95, such as from about 50 to about 75, or from about 60 to about 70° C. Silane is for example slowly added to the silica particles under vigorous agitation at a temperature above about 60° C. and at a controlled rate, which suitably is from about 0.01 to about 100, such as from about 0.1 to about 10, from about 0.5 to about 5, or from about 1 to about 2 silane molecules per nm$^2$ colloidal silica surface area (on the colloidal silica particles) and hour. The addition of silane can be continued for any suitable time depending on the addition rate, amount of silane to be added, and degree of desired silylation. However, the addition of silane can be continued up to about 5 hours, or up to about 2 hours until a suitable amount of silane compounds has been added. According to one embodiment, from about 0.1 to about 6, such as from about 0.3 to about 3, or from about 1 to about 2 silane molecules per nm$^2$ surface area of the colloidal silica particles is added. Continuous addition of silane to the colloidal particles may be particularly important when preparing highly concentrated silanised silica dispersions having a silica content up to about 80 wt %.

According to one embodiment, silane can be diluted before mixing it with the colloidal silica particles, e.g. with water to form a premix of silane and water, suitably in a weight ratio of from about 1:8 to about 8:1, from about 3:1 to about 1:3, or from about 1.5:1 to about 1:1.5. The resulting silane-water solution is substantially clear and stable and easy to mix with the colloidal silica particles.

According to one embodiment, the weight ratio of silane to silica in the dispersion may be from about 0.01 to about 1.5, specifically from about 0.05 to about 1, such as 0.05 to 0.4, and more specifically from about 0.1 to about 0.5, or from about 0.2 to about 0.4 or from about 0.2 to about 0.3.

Further suitable embodiments of silane, colloidal silica and preparation of silanised silica are disclosed in EP 1554221 B1.

Preferably, the silanized colloidal silica particles can remain stably dispersed, i.e. remain colloidally dispersed without gelling or precipitation at normal storage at a temperature from 15 to 35° C. for a period of at least 2 months, preferably at least 4 months, and most preferably for at least 6 months. Preferably, the composition according to the claimed invention also can remain stable, i.e. without gelling or precipitation at normal storage at a temperature from 15 to 35° C. for a period of at least 2 months, preferably at least 4 months, and most preferably for at least 6 months, or most preferably 1 year.

Coating compositions may vary, with different types and amounts of pigments, binders, additives, and carrier fluids. The differences in coating compositions provide film characteristics specifically set for the part and its end-use. Often, one type of coating cannot be formulated to provide all of the desired properties. Several layers of different coating material may be applied to a surface to form a coating film that will thoroughly protect the part. The first coat is typically called the primer, or undercoat, and the final layers are called topcoats. Regardless of the coating formulation or number of layers applied, proper preparation, application techniques, and curing processes may be necessary for the desired coating characteristics to be achieved.

According to one embodiment, depending on the use of the coating, the coating composition comprises several binders, for example two or three binders, in combination. According to one embodiment, the coating composition comprises pigment particles which typically are colorant portion of the coating composition, for example titanium oxide. The pigment may also be used to provide corrosion protection, stability in ultraviolet (UV) light, or protection from mold, mildew or bacteria. Others can be used for their conductive ability, texture, or metallic or pearlescent appearance. According to one embodiment, the coating composition comprises a filling agent, for example talcum and calcium carbonate which can be used to lower the cost of a paint obtainable from the coating (paint) dispersion. According to one embodiment, a filler and/or pigment is present in the coating composition in an amount ranging from about 10 to about 80, for example from about 20 to about 60, or from about 30 to about 50 wt % based on the total dry or carrier fluid-free weight of the composition.

According to one embodiment, the coating composition comprises a thickener to regulate the viscosity of the paint. According to one embodiment, a thickener is present in the coating composition in an amount from about 0.1 to about 2 wt % based on the dry weight or carrier fluid-free weight of the composition. According to one embodiment, yet further additives may be present which are usually low molecular weight chemicals in coating formulations that allow coatings to perform specific functions but do not contribute to colouring. Non-pigment additives include stabilizers to block attacks of ultraviolet light or heat, curing additives to speed up the crosslinking reaction, co-solvents to increase viscosity, or plasticizers to improve uniform coating. According to one embodiment, a stabilizer is present in the composition in an amount from about 0.1 to about 3 wt % based on the total dry or carrier fluid-free weight of the composition. According to one embodiment, a curing agent such as a UV initiator is present in the coating composition in an amount ranging from about 0.1 to about 1 wt % based on the total dry or solvent-free weight of the composition.

The invention also relates to a method of producing a coating composition comprising mixing
a) silanized colloidal silica particles; and
b) an alkyd-containing binder; and
c) a carrier fluid,
wherein essentially no cobalt-based drier is added thereto.

Preferably, amounts of components a-c mixed are as defined herein above so as to result in desired proportions of the claimed composition as defined herein. Specifically, according to one embodiment, the metal content of the cobalt-based drier or other active drier as defined herein added to the composition is less than 200 ppm, for example less than 20 ppm or less than 2 ppm based on the weight of the alkyd-containing binder or total weight of binder of the forming composition. According to one embodiment, no active drier is added to the coating composition. According to one embodiment, an auxiliary drier as defined herein is added to the composition, preferably in amounts as described herein resulting in an amount of less than 100, for example less than 10 or less than 1 ppm based on the alkyd-containing binder or total weight of binder. According to one embodiment, the silanized colloidal silica particles are added to the coating formulation in an amount ranging from about 1 to about 50, for example from about 2 to about 25, for example about 5 to about 20, or from about 8 to about 15 wt % based on the resulting total dry or carrier fluid free weight of the composition. According to one embodiment, silanized colloidal silica particles and alkyd-containing binder or total amount of binder are added in a weight ratio of silanized silica to binder ranging from about 0.05 to about 2. According to one embodiment, the silica particles and the alkyd-containing binder are mixed in an aqueous dispersion. According to one embodiment, the silica particles and the alkyd-containing binder are mixed at a temperature ranging from about 20 to about 90° C., for example from about 20 to about 35° C. The invention also relates to a coating composition obtainable from the method as defined herein.

The invention also relates to the use of a coating composition for coating a substrate, for example a wood, plastic substrate, cementitious substrate, brick substrate, ceramic material, metallic substrate, mineral substrate or the like. Typically, the coating composition is transformed to a surface coating of a substrate by drying at suitable conditions, for example by simple solvent evaporation or air-drying at ambient or slightly elevated temperatures.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

A formulation of components 1-6 was prepared by mixing the components in the prescribed amounts to form a grinding paste which was milled during 20 minutes by means of a Dispersant® CV equipped with a dissolver disc rotating at a radial velocity of 20 m/s. Subsequently, components 7-11 were let down to the grinding paste in prescribed amounts under gentle agitation by means of an agitator.

TABLE 1

Paint formulation

| Products | Weight parts |
|---|---|
| Grinding paste | |
| 1. Water | 202.5 |
| 2. Coadis BR95 | 15 |
| 3. Coapur XS22 | 22.5 |
| 4. Byk 093 | 6 |
| 5. KRONOS ® 2190 | 300 |
| 6. Omyacoat 850OG | 195 |
| Let down | |
| 7. water | 72 |
| 8. Aquaflow nhs 350 | 30 |
| 9. Coapur XS22 | 15 |
| 10. Ser Ad FA 179 | 4.5 |
| 11. SYNAQUA 4804 | 592.5 |
| Total | 1458 |

Byk 093 is an antifoaming agent. Coadis BR95 is a dispersant for alkyd emulsion systems. CoapurXS22 is a polyurethane thickener. Kronos is a titanium dioxide pigment. Aquaflow™ is a thickening additive for waterborne decorative coating applications. SER AD FA 179 is an antifoamant/wetting agent. Additol VXW 6206 (siccative) is a cobalt-containing drying agent. SYNAQUA 4804 is a short oil alkyd emulsion. Omyacoat® 850 OG designates a calcium carbonate sold by the company OMYA® which is a specific dispersant for alkyd emulsion systems. Octa-Soligen Zirconium 10® aqua is a zirconium-containing cobalt-free drying siccative.

TABLE 2

Characteristics of the paint formulation

| Density (g/cm$^3$) | 1.34 |
|---|---|
| Weight % Solids (%) | 56 |
| Volume % Solids (%) | 41 |
| PVC (%) | 33 |
| VOC (water incl.) (g/L) | 0 |

Silica products (Bindzil® CC301 and Bindzil® CC401, Bindzil® CC151, Bindzil® CC302) were mixed with the paint formulation. Paint A reference was prepared by addition of 1.5 wt % based on dry resin of Additol VXW 6206 (a cobalt-containing drying siccative) to the formulation of table 1 (Paint A). Also, a reference without Bindzil and cobalt-containing siccative was used (Paint B). In addition, paint C (reference) was prepared by addition of a siccative agent: Octa-Soligen Zirconium 10 aqua (a zirconium-containing cobalt-free drying siccative), 0.15 wt % Zr metal (equal to 1.5 wt % Octa-Soligen product), based on dry resin (to the formulation of table 1 (Paint C). Also, the further compositions from the paint formulation were prepared by addition of Bindzil CC products according to the below:

TABLE 3

Coating formulations

Paint A - REF: cobalt siccative agent + formulation of Table 1
Paint B - REF contains formulation of table 1 (cobalt-free)
Paint B21 contains 95 g paint B + 5 g Bindzil CC301
Paint B22 contains 90 g paint B + 10 g Bindzil CC301
Paint B23 contains 85 g paint B + 15 g Bindzil CC301
Paint B31 contains 95 g paint B + 5 g Bindzil CC401
Paint B32 contains 90 g Paint B + 10 g Bindzil CC401

TABLE 3-continued

Coating formulations

Paint B33 contains 85 g Paint B + 15 g Bindzil CC401
Paint B1 contains 90 g paint B + 10 g Bindzil CC151
Paint B4 contains 90 g paint B + 10 g Bindzil CC302
Paint C - REF: zirconium siccative agent (cobalt-free) + formulation of table 1
Paint C21 contains 85 g paint C + 15 g Bindzil CC301

Dirt Pick-Up Tests (DPU)

DPU tests were performed by applying the paints by means of a brush on a pine wood substrate in two layers (24 hours between applications of the two layers). After 1 and 2 months of drying at room temperature, the surfaces were contaminated with either a water-based solution with red iron oxide or water-based solution with carbon black as set out below. The contamination was applied by means of spraying. The contaminated systems were subsequently left to dry 24 hours at room temperature. The contaminated surfaces were washed with water. The CIELAB colour system was used and the values of L, a, b, and delta E were determined as described in Applications Note, Insight on Color, Vol. 8, 9 from Hunter Associates Laboratory (www.hunterlab.com/appnotes/an07_96a.pdf) and Chromameter manual CR-200, p. 71-75 www.konicaminolta.com/content/download/4728/34959/CR-200.PDF.

Dirtying solutions

| | |
|---|---|
| Red iron oxide | 1 gram pigment + 200 ml water |
| Carbon black (printex G) | 1 gram pigment + 200 ml water |

TABLE 4

Red iron oxide contamination - alkyd paints - drying time 2 months

| | INITIAL before contamination | | | Surface washing with water | | | |
|---|---|---|---|---|---|---|---|
| | L | a | b | L | a | b | delta E |
| Paint A-REF | 94.78 | −0.82 | 2.75 | 94.37 | −0.2 | 3.04 | |
| | 95.03 | −0.66 | 3.11 | 94.28 | 0.03 | 3.3 | |
| | 94.97 | −0.72 | 2.65 | 94.52 | −0.13 | 3.23 | |
| | 94.92 | −0.74 | 2.73 | 94.29 | −0.09 | 3.22 | |
| | 94.97 | −0.59 | 2.84 | 94.21 | −0.08 | 3.37 | |
| Average | 94.93 | −0.71 | 2.82 | 94.33 | −0.09 | 3.23 | 0.95 |
| Paint B-REF without Co | 95.31 | −0.54 | 1.88 | 90.49 | 5.01 | 7.33 | |
| | 95.54 | −0.66 | 2.19 | 90.3 | 5.1 | 7.49 | |
| | 95.14 | −0.51 | 1.74 | 90.91 | 4.68 | 7.03 | |
| | 95.06 | −0.49 | 1.65 | 91.2 | 4.18 | 7.1 | |
| | 95.49 | −0.64 | 1.97 | 92.27 | 3.08 | 5.98 | |
| Average | 95.31 | −0.57 | 1.89 | 91.03 | 4.41 | 6.99 | 8.31 |
| B21 | 95.5 | −0.55 | 1.94 | 92.14 | 3.37 | 5.9 | |
| | 95.47 | −0.54 | 1.89 | 92.79 | 2.42 | 5.42 | |
| | 95.44 | −0.57 | 1.96 | 92.84 | 2.62 | 5.37 | |
| | 95.22 | −0.46 | 1.66 | 93.31 | 1.98 | 4.96 | |
| | 95.36 | −0.57 | 1.74 | 93.56 | 1.73 | 4.93 | |
| Average | 95.40 | −0.54 | 1.84 | 92.93 | 2.42 | 5.32 | 5.19 |
| B22 | 95.61 | −0.5 | 1.74 | 94.14 | 1.05 | 3.53 | |
| | 95.59 | −0.5 | 1.88 | 93.17 | 2.58 | 4.8 | |
| | 95.6 | −0.5 | 1.9 | 94.44 | 0.74 | 3.2 | |
| | 95.36 | −0.47 | 1.54 | 94.61 | 0.44 | 2.92 | |
| | 95.27 | −0.44 | 1.57 | 94.25 | 0.95 | 3.31 | |
| Average | 95.49 | −0.48 | 1.73 | 94.12 | 1.15 | 3.55 | 2.80 |
| B23 | 95.31 | −0.47 | 1.49 | 94.72 | 0.57 | 2.78 | |
| | 95.55 | −0.49 | 1.6 | 94.35 | 0.82 | 3.2 | |
| | 95 | −0.51 | 1.08 | 94.86 | 0.37 | 2.86 | |

TABLE 4-continued

Red iron oxide contamination - alkyd paints - drying time 2 months

| | INITIAL before contamination | | | Surface washing with water | | | |
|---|---|---|---|---|---|---|---|
| | L | a | b | L | a | b | delta E |
| | 95.26 | −0.43 | 1.46 | 94.74 | 0.34 | 2.75 | |
| | 95.07 | −0.38 | 1.32 | 95 | 0.19 | 2.54 | |
| Average | 95.24 | −0.46 | 1.39 | 94.73 | 0.46 | 2.83 | 1.78 |
| B31 | 95.14 | −0.49 | 1.6 | 92.62 | 2.6 | 5.74 | |
| | 95.36 | −0.56 | 1.9 | 93.74 | 1.15 | 4.45 | |
| | 95.32 | −0.54 | 1.67 | 93.7 | 1.28 | 4.37 | |
| | 95.15 | −0.45 | 1.63 | 93.78 | 1.12 | 4.09 | |
| | 95.28 | −0.57 | 1.63 | 93.42 | 1.36 | 4.42 | |
| Average | 95.25 | −0.52 | 1.69 | 93.45 | 1.50 | 4.61 | 3.99 |
| B32 | 95.04 | −0.31 | 1.74 | 93.34 | 1.69 | 4.62 | |
| | 95.13 | −0.42 | 1.83 | 93.1 | 1.66 | 4.39 | |
| | 94.85 | −0.41 | 1.57 | 94.01 | 0.76 | 3.5 | |
| | 94.87 | −0.29 | 1.55 | 94.31 | 0.32 | 2.8 | |
| | 94.84 | −0.29 | 1.52 | 94.02 | 0.92 | 3.73 | |
| Average | 94.95 | −0.34 | 1.64 | 93.76 | 1.07 | 3.81 | 2.85 |
| B33 | 95.14 | −0.32 | 1.94 | 94.24 | 0.55 | 2.99 | |
| | 95.14 | −0.38 | 1.88 | 94.01 | 0.77 | 3.23 | |
| | 95.17 | −0.33 | 1.92 | 94.18 | 0.69 | 3.27 | |
| | 94.96 | −0.33 | 1.75 | 94.47 | 0.33 | 2.93 | |
| | 94.98 | −0.37 | 1.74 | 94.24 | 0.32 | 2.65 | |
| Average | 95.08 | −0.35 | 1.85 | 94.23 | 0.53 | 3.01 | 1.69 |

TABLE 5

Red iron oxide contamination - alkyd paints - drying time 1 month

| | INITIAL before contamination | | | Surface washing with water | | | |
|---|---|---|---|---|---|---|---|
| | L | a | b | L | a | b | delta E |
| Paint C-REF | 94.92 | −0.44 | 1.7 | 90.6 | 4.58 | 5.58 | |
| | 94.83 | −0.41 | 1.68 | 90.92 | 4.13 | 5.55 | |
| | 94.68 | −0.39 | 1.41 | 91.26 | 3.8 | 5.13 | |
| | 95.07 | −0.54 | 1.73 | 90.09 | 4.83 | 5.66 | |
| | 95.03 | −0.41 | 1.71 | 90.15 | 5.03 | 6.25 | |
| Average | 94.91 | −0.44 | 1.65 | 90.60 | 4.47 | 5.63 | 7.65 |
| Paint C21 | 94.58 | −0.11 | 1.28 | 93.58 | 1.41 | 2.47 | |
| | 94.54 | −0.18 | 0.96 | 93.49 | 1.48 | 2.84 | |
| | 94.72 | −0.28 | 0.96 | 93.42 | 1.38 | 2.39 | |
| | 94.77 | −0.05 | 1.45 | 93.72 | 1.3 | 2.61 | |
| | 94.89 | −0.26 | 1.27 | 92.93 | 2.05 | 3.11 | |
| Average | 94.70 | −0.18 | 1.18 | 93.43 | 1.52 | 2.68 | 2.60 |

TABLE 6

Carbon black contamination - alkyd paints - drying time 2 months

| | INITIAL before contamination | | | Surface washing with water | | | |
|---|---|---|---|---|---|---|---|
| | L | A | b | L | a | b | delta E |
| Paint A-REF | 95.06 | −0.68 | 3.07 | 88.03 | −0.27 | 3.01 | |
| | 95.08 | −0.74 | 3 | 86.05 | −0.1 | 3.06 | |
| | 94.89 | −0.8 | 2.45 | 87.42 | −0.09 | 3.19 | |
| | 94.7 | −0.71 | 2.27 | 89.74 | −0.36 | 3.16 | |
| | 94.98 | −0.57 | 2.85 | 89.83 | −0.54 | 2.94 | |
| Average | 94.94 | −0.70 | 2.73 | 88.21 | −0.27 | 3.07 | 6.75 |
| Paint B-REF | 95.33 | −0.53 | 1.93 | 66.1 | 0.33 | 1.89 | |
| | 95.41 | −0.57 | 2.02 | 63.2 | −0.03 | 2.2 | |
| | 95.24 | −0.56 | 1.9 | 65.32 | −0.1 | 1.88 | |
| | 95.11 | −0.46 | 1.72 | 64.27 | 0.39 | 2.06 | |
| | 95.27 | −0.52 | 1.83 | 64.96 | 0.37 | 2.03 | |
| Average | 95.27 | −0.53 | 1.88 | 64.77 | 0.19 | 2.01 | 30.51 |
| B21 B | 95.5 | −0.55 | 1.94 | 71.55 | −0.1 | 2.08 | |
| | 95.47 | −0.54 | 1.89 | 69.16 | −0.16 | 2.17 | |
| | 95.44 | −0.57 | 1.96 | 73.68 | −0.11 | 2.05 | |

TABLE 6-continued

Carbon black contamination - alkyd paints - drying time 2 months

| | INITIAL before contamination | | | Surface washing with water | | | |
|---|---|---|---|---|---|---|---|
| | L | A | b | L | a | b | delta E |
| | 95.22 | −0.46 | 1.66 | 73.51 | −0.03 | 2.11 | |
| | 95.36 | −0.57 | 1.74 | 72.24 | −0.21 | 2.24 | |
| Average B22 | 95.40 | −0.54 | 1.84 | 72.03 | −0.12 | 2.13 | 23.38 |
| | 95.61 | −0.5 | 1.74 | 78.44 | −0.27 | 2 | |
| | 95.59 | −0.5 | 1.88 | 76.25 | −0.1 | 2.16 | |
| | 95.6 | −0.5 | 1.9 | 83.84 | −0.52 | 2.05 | |
| | 95.36 | −0.47 | 1.54 | 79.96 | −0.33 | 2.2 | |
| | 95.27 | −0.44 | 1.57 | 80.35 | −0.31 | 1.93 | |
| Average B23 | 95.49 | −0.48 | 1.73 | 79.77 | −0.31 | 2.07 | 15.72 |
| | 95.31 | −0.47 | 1.49 | 85.67 | −0.44 | 1.74 | |
| | 95.55 | −0.49 | 1.6 | 86.87 | −0.44 | 1.7 | |
| | 95 | −0.51 | 1.08 | 89.36 | −0.27 | 1.72 | |
| | 95.26 | −0.43 | 1.46 | 89.04 | −0.52 | 1.63 | |
| | 95.07 | −0.38 | 1.32 | 87.81 | −0.31 | 1.57 | |
| Average B31 | 95.24 | −0.46 | 1.39 | 87.75 | −0.40 | 1.67 | 7.49 |
| | 95.14 | −0.49 | 1.6 | 75.8 | −0.07 | 1.78 | |
| | 95.36 | −0.56 | 1.9 | 79.6 | −0.2 | 1.63 | |
| | 95.32 | −0.54 | 1.67 | 79.05 | −0.3 | 1.96 | |
| | 95.15 | −0.45 | 1.63 | 75.16 | −0.06 | 1.75 | |
| | 95.28 | −0.57 | 1.63 | 77.26 | −0.46 | 1.84 | |
| Average B32 | 95.25 | −0.52 | 1.69 | 77.37 | −0.22 | 1.79 | 17.88 |
| | 95.04 | −0.31 | 1.74 | 77.73 | −0.21 | 2.25 | |
| | 95.13 | −0.42 | 1.83 | 78.92 | −0.35 | 2.35 | |
| | 94.85 | −0.41 | 1.57 | 78.16 | −0.18 | 2.18 | |
| | 94.87 | −0.29 | 1.55 | 78.59 | −0.15 | 2.05 | |
| | 94.84 | −0.29 | 1.52 | 75.9 | −0.31 | 1.93 | |
| Average B33 | 94.95 | −0.34 | 1.64 | 77.86 | −0.24 | 2.15 | 17.09 |
| | 95.14 | −0.32 | 1.94 | 81.2 | −0.04 | 1.79 | |
| | 95.14 | −0.38 | 1.88 | 82.73 | −0.21 | 2.07 | |
| | 95.17 | −0.33 | 1.92 | 82.8 | −0.27 | 2.1 | |
| | 94.96 | −0.33 | 1.75 | 81.99 | −0.14 | 2.35 | |
| | 94.98 | −0.37 | 1.74 | 83.63 | −0.01 | 2.23 | |
| Average | 95.08 | −0.35 | 1.85 | 82.47 | −0.13 | 2.11 | 12.61 |

TABLE 7

Carbon black contamination - alkyd paints - drying time 1 month

| | INITIAL before contamination | | | Surface washing with water | | | |
|---|---|---|---|---|---|---|---|
| | L | A | b | L | a | b | delta E |
| PaintC-REF | 94.73 | −0.33 | 1.75 | 76.68 | −0.16 | 1.09 | |
| | 95.01 | −0.45 | 1.85 | 79.68 | −0.16 | 0.98 | |
| | 94.86 | −0.35 | 1.78 | 76.9 | 0.12 | 1.38 | |
| | 94.8 | −0.32 | 1.59 | 75.01 | −0.48 | 1.29 | |
| | 95.01 | −0.4 | 1.67 | 78.19 | 0.12 | 1.28 | |
| Average Paint C21 | 94.88 | −0.37 | 1.73 | 77.29 | −0.11 | 1.20 | 17.60 |
| | 95.17 | −0.55 | 1.17 | 83.98 | −0.34 | 0.94 | |
| | 94.98 | −0.36 | 1.32 | 84.55 | 0.07 | 0.97 | |
| | 95.37 | −0.39 | 1.35 | 84.27 | −0.21 | 0.96 | |
| | 95.04 | −0.37 | 1.15 | 85.54 | −0.1 | 1.05 | |
| | 95.13 | −0.35 | 1.23 | 84.73 | −0.16 | 1.05 | |
| Average | 95.14 | −0.40 | 1.24 | 84.61 | −0.15 | 0.99 | 10.53 |

From the results above, in tables 4-7, it can be clearly seen the yellowing effect of the coating is reduced for paint formulations comprising Bindzil as indicated by the b values prior to contamination compared to paints A and B (references). Also, it can be noted the value of b after surface washing with water is maintained at a lower level than paints without Bindzil and siccative which indicates acceptable b values are obtained also after washing with water. Further, the dirt pick-up, measured as the total colour difference, delta E is dramatically reduced, and hence the dirt pick-up resistance improved, for the samples containing silanized colloidal silica relative to formulation B and in some cases reach the same level as the siccative containing formulation A. This is true for both types of dirt; hydrophilic iron oxide dirt and hydrophobic carbon black dirt.

Vapour Water Permeability

The water vapour permeability was determined according to ISO 7783-1 (Determination of water vapour transmission rate—part 1: Dish method for free films). The paints were applied on a Teflon sheet. The dry film thickness was about 70 μm. The permeability measurements have been carried out on seven disks for each paint after 14 days of drying at room temperature The water-vapour transmission coefficient and vapour water permeability have been calculated from the rate of change in mass of the dish assembly according to the formula detailed in the ISO standard and are presented in Table 8 below.

TABLE 8

Vapour water transmission

| | Vapor water transmission coefficient $(g/m^2 \cdot d)$ | | Vapor water permeability $(mole/m \cdot s \cdot Pa)$ | |
|---|---|---|---|---|
| | average | std | average | Std |
| Paint A - REF | 70.18 | 2.28 | 4.50E−08 | 1.73E−09 |
| Paint B - REF | 121.74 | 11.78 | 7.47E−08 | 7.22E−09 |
| Paint B21 | 136.08 | 7.28 | 7.71E−08 | 4.13E−09 |
| Paint B22 | 190.83 | 10.99 | 1.15E−07 | 6.87E−09 |
| Paint B23 | 214.33 | 20.64 | 1.21E−07 | 9.16E−09 |
| Paint B31 | 104.23 | 5.13 | 5.66E−08 | 2.79E−09 |
| Paint B32 | 105.7 | 5.91 | 6.24E−08 | 3.49E−09 |
| Paint B33 | 103.07 | 6.69 | 5.87E−08 | 4.89E−09 |
| Paint C - REF | 65.41 | 5.53 | 3.89E−08 | 3.92E−09 |
| Paint C21 | 120.54 | 17.10 | 6.88E−08 | 9.03E−09 |

Std: standard deviation

It can be clearly seen from all samples that the present invention outperform the siccative-containing samples (references A and C) with respect to vapour water transmission.

Drying Time

The drying time was measured according to ASTM 5896. A 120 μm (humid thickness) film was applied on glass for the drying time determinations. It describes a test method for measuring times of drying or curing during film formation of organic coatings using mechanical recorders. The mechanical recorders give valuable results for paints that dry without skin formation at the paint surface. The considered time as drying time is the one for which the needle of the recorder doesn't mark the paint film surface anymore it is related to the total closing of the films. It has to be noted that a permanent trace (very slightly) remains on the paint surface in all cases even when the siccative agent is present The drying time recording has been conducted in triplicate, they are presented in Table 9.

The following results showed that drying time is essentially maintained even in the absence of a metallic drier. The addition of silanized silica in many cases reduced the drying time relative to paint B and the Bindzil CC401 containing samples had almost as short drying time as the siccative containing formulation, paint A.

TABLE 9

| | Drying time | | | | |
|---|---|---|---|---|---|
| | Drying time (min) | | | Average | Std |
| Paint A - REF | 14.1 | 11.5 | 19 | 14.9 | 3.8 |
| Paint B - REF | 19.2 | 16.1 | 23.1 | 19.5 | 3.5 |
| Paint Ba* | 25.5 | 24.8 | 21.1 | 23.8 | 2.4 |
| Paint BB* | 23.4 | 26.3 | 24 | 24.6 | 1.5 |
| Paint B21 | 20.6 | 17.4 | 24.3 | 20.8 | 3.5 |
| Paint B22 | 20.3 | 18.5 | 23.8 | 20.9 | 2.7 |
| Paint B23 | 17.9 | 16.8 | 22 | 18.9 | 2.7 |
| Paint B31 | 14.9 | 18.3 | 12.4 | 15.2 | 3.0 |
| Paint B32 | 17.7 | 18 | 13.8 | 16.5 | 2.3 |
| Paint B33 | 16.6 | 17.7 | 13.5 | 15.9 | 2.2 |
| Paint B1 | 36 | 36.3 | 29.6 | 34.0 | 38 |
| Paint B4 | 30.4 | 39 | 35.7 | 35.0 | 4.3 |
| Paint C - REF | 17 | 15 | 16 | 16.0 | 1.0 |
| Paint C21 | 28 | 25 | 21 | 24.7 | 3.5 |

*Ba has same dry content as B21
*BB has same dry content as B22
Std: standard deviation Hardness Tests The hardness of the formulations was tested according to EN ISO 1522. The paints were applied on tin plated steel (150 µm humid thickness). The results below indicate the hardness in Persoz hardness (in seconds) after 1, 7, and 27 days respectively. The Persoz hardness of the different paints listed in Table 10 have been determined at 20° C. and 50% relative humidity and each value is a mean of 5 measured values. It can be noted the hardness is essentially maintained or improved in view of the siccative-containing sample.

TABLE 10

| | Persoz Hardness(s) | | | | | |
|---|---|---|---|---|---|---|
| | 1 d | | 7 d | | 27 d | |
| | Average | Std | Average | std | Average | std |
| Paint A - REF | 39 | 1 | 58 | 1 | 62 | 2 |
| Paint B - REF | 23 | 0 | 46 | 1 | 52 | 1 |
| Paint B1 | 22 | 0 | 46 | 1 | 53 | 1 |
| Paint B21 | 26 | 1 | 51 | 1 | 58 | 1 |
| Paint B22 | 30 | 1 | 62 | 0 | 71 | 0 |
| Paint B23 | 33 | 1 | 67 | 1 | 77 | 1 |
| Paint B31 | 30 | 1 | 53 | 1 | 61 | 1 |
| Paint B32 | 33 | 1 | 59 | 1 | 66 | 1 |
| Paint B33 | 37 | 1 | 67 | 1 | 75 | 1 |
| Paint B4 | 25 | 0 | 50 | 1 | 55 | 0 |
| Paint C—REF | 17 | 0 | 21 | 1 | 48 | 1 |
| Paint C21 | 21 | 1 | 30 | 1 | 64 | 2 | std: standard deviation

The invention claimed is:

1. A coating composition comprising:
   a) silanized colloidal silica particles having an average particle diameter ranging from 2 to 150 nm and a weight ratio of silane to silica ranging from 0.05 to 0.4,
   b) an alkyd-containing binder and, optionally, an other binder,
   c) a carrier fluid selected from water and/or an organic solvent, and
   d) optionally, a cobalt based drier,
wherein the cobalt based drier, if present, has a cobalt content of less than 200 ppm based on the total weight of binder, and wherein the alkyd-containing binder is selected from epoxy-modified or polyurethane-modified alkyds.

2. The composition according to claim 1, wherein the composition contains cobalt in an amount less than 100 ppm based on the total weight of binder.

3. The composition according to claim 1, wherein no cobalt drier is present in the coating composition.

4. The composition according to claim 1, wherein the colloidal silica particles have an average particle diameter ranging from about 6 to about 12 nm.

5. The composition according to claim 1, wherein the weight ratio of silanized colloidal silica particles to total amount of binder ranges from about 0.05 to about 2.

6. The composition according to claim 1, wherein the composition is an aqueous dispersion.

7. The composition according to claim 1, wherein the silanized colloidal silica particles are present in the composition in an amount from about 2 to about 25 wt % based on the carrier fluid free weight of the composition.

8. A method of producing a coating composition comprising mixing
   a) silanized colloidal silica particles having an average particle diameter ranging from 2 to 150 nm and a weight ratio of silane to silica of 0.05 to 0.4; and
   b) an alkyd-containing binder and, optionally, an other binder; and
   c) a carrier fluid selected from water and/or an organic solvent; and
   d) optionally, a cobalt based drier,
wherein the cobalt based drier, if present, has a cobalt content of less than 200 ppm based on the total weight of binder in the coating composition, and wherein the alkyd-containing binder is selected from epoxy-modified or polyurethane-modified alkyds.

9. The method according to claim 8, wherein no cobalt-based drier is added to the coating composition.

10. The method according to claim 8, wherein the silanized colloidal silica particles and alkyd-containing binder or total amount of binder are added in a weight ratio of silanized silica to binder ranging from about 0.05 to about 2.

11. A method of coating a substrate comprising coating a substrate with the coating composition according to claim 1.

* * * * *